United States Patent [19]
Hochberg

[11] 3,982,251
[45] Sept. 21, 1976

[54] METHOD AND APPARATUS FOR RECORDING INFORMATION ON A RECORDING MEDIUM

[75] Inventor: Frederick Hochberg, Yorktown Heights, N.Y.

[73] Assignee: IBM Corporation, Armonk, N.Y.

[22] Filed: May 6, 1975

[21] Appl. No.: 575,094

Related U.S. Application Data

[63] Continuation of Ser. No. 499,884, Aug. 23, 1974, abandoned.

[52] U.S. Cl. .................................. 346/1; 106/21; 346/75; 346/140 R
[51] Int. Cl.² .................................. G01D 15/18
[58] Field of Search ............ 346/75, 140, 1; 106/21, 106/20; 427/53, 54, 56

[56] References Cited
UNITED STATES PATENTS

| | | | |
|---|---|---|---|
| 1,770,493 | 7/1930 | Ranger | 346/1 |
| 3,560,229 | 2/1971 | Farnham | 106/21 |
| 3,878,519 | 4/1975 | Eaton | 346/1 |

OTHER PUBLICATIONS

Chang et al., *Color Modulated Dye Ink Jet Printer*, IBM Tech. Disc. Bulletin, vol. 17, No. 5, Oct. 1974, pp. 1520–1521.

*Primary Examiner*—Joseph W. Hartary
*Attorney, Agent, or Firm*—Frank C. Leach, Jr.

[57] ABSTRACT

Streams of ink droplets are formed of a material which changes from transparent or colorless to a color when subjected to a selected energy source. A print pattern is produced on a movable paper through selectively controlling the droplets to which the selected energy source is applied. The droplets which remain transparent or colorless because of not being exposed to the selected energy source can be deactivated by a second source of energy so that these droplets will not subsequently print.

52 Claims, 4 Drawing Figures

METHOD AND APPARATUS FOR RECORDING INFORMATION ON A RECORDING MEDIUM

This is a continuation of application Ser. No. 499,884, filed Aug. 23, 1974 now abandoned.

In ink jet printing, a stream of ink is supplied under pressure and periodically perturbed to produce droplets, which impinge upon a suitable recording medium such as a sheet of moving paper, for example. To obtain printing on the paper by the ink, it is necessary that the droplets be spaced substantially uniform distances from each other and be of substantially uniform size.

To produce the desired print pattern on the paper, the droplets must be individually directed to the paper or deflected prior to reaching the paper in accordance with the pattern to be printed. To obtain the deflection of the droplets, it is necessary that the droplets be capable of being electrostatically charged or have magnetic properties so as to be capable of being selectively deflected.

The present invention eliminates the requirement for any charging and deflection of the droplets to produce a desired print pattern. The present invention accomplishes this through forming the liquid streams of a material with photochromic or electrochromic or thermal properties or combinations thereof so that each of the streams is transparent or colorless unless subjected to the appropriate energy source to which the material responds to change from transparent to a color. Thus, only those portions of each of the streams subjected to the appropriate energy source will produce a color or ink spot on the paper.

The present invention also enables the ink spots, which are the portions subjected to an appropriate energy source, to have different contrasts depending on the amount of energy applied thereto. Thus, the print pattern produced by the present invention can be of varying contrast.

When deflecting various of the droplets to form a desired print pattern, the absence of some of the droplets from the stream creates an aerodynamic problem. This is because the spacing between the droplets is no longer uniform so that a droplet adjacent to the space from which a droplet was deflected tends to increase in velocity. As a result, the droplets have different velocities depending on the spacing therebetween because of the absence of some of the droplets. Thus, the desired uniform velocity to obtain the desired print pattern is affected by the deflection of some of the droplets in the stream.

The present invention overcomes this problem since none of the droplets is deflected. Thus, the present invention obtains the desired print pattern without any requirement for deflection so that each of the droplets strikes the paper even though all are not used to print.

To obtain the desired electrostatic charging of the droplets since the droplets are selectively charged to be deflected, it is necessary that the break off point of the droplets from the stream be uniform and synchronized in accordance with the charging, which occurs adjacent to the break off point. When the liquid stream is formed of a material with photochromic or thermal properties or a combination thereof, the need for critical synchronization of the break off point of the droplets from the stream is eliminated.

While the need for the critical synchronization of the break off point of the droplets from the stream is required when the liquid stream is formed of a material with electrochromic properties, this problem can be avoided with the present invention through not forming the stream into droplets. Thus, by merely applying the electric field to the electrochromic material, light radiation to the photochromic material, or heat radiation to the thermal material, various portions of the stream can be selected for printing. Accordingly, by not forming the stream into droplets, the problem of synchronization of the break off point of the droplets from the stream is eliminated.

In prior thermal printing, paper has been specially treated to respond to heat applied to portions of the paper to produce a desired print pattern. Paper also has been specially treated to respond to light radiation of a selected wavelength to produce a desired print pattern. However, this paper has required the expense of special treatment.

The present invention overcomes this problem of the specially treated paper in that printing can be accomplished on any type of substrate. Thus, the cost of specially treated paper is eliminated by the present invention.

Furthermore, when subjecting the specially treated paper to heat, the heat spreads laterally from the area of the paper to which it is applied. Thus, the resolution of the print pattern produced by the specially treated paper to which heat is applied is limited because of the lateral spread of the heat.

Since the application of the heat is to each of the selected droplets in the present invention, there is no spreading of the heat so that the print pattern has better resolution. Since the paper is not sensitive to the heat of the droplets, any spreading of the heat from the droplet after the droplet strikes the paper does not have any effect on the print resolution.

Accordingly, the present invention enables the recording of information on a recording medium without the requirement of any deflection or charging and without the requirement of any specially treated paper. The present invention accomplishes this through treating the liquid forming the ink before it strikes the paper. Thus, by controlling the liquid state rather than the state of the paper, a much greater flexibility is provided in preparing the material.

Through applying the energy source to the material having the property capable of changing from transparent to a color when the material is in a liquid state, there is a greater selectivity in the utilization of the materials such as the sensitizers and the print out materials, for example. Thus, the material forming the ink can be made so as to have one material responsive for changing to a color and another material responsive for desensitizing, for example.

Therefore, the present invention enables one to utilize the unique characteristics of materials formed of photochromic, electrochromic, or thermally sensitive properties without having to employ a specially treated paper. Accordingly, the information can be recorded on a variety of substrates.

By applying the energy source to the material when it is in its liquid state, the time for change from transparent to a color is less than if the energy source is applied to paper to change a portion of the paper to a color. Thus, application of the energy source to the liquid results in the printing speed being increased.

A faster response to the energy source also can be obtained when applying the energy source to the liquid rather than to a solid through using a higher degree of solvent, for example, to reduce the time to respond to the energy source. Since this solvent evaporates when the droplets strike the paper, the additional solvent does not present a problem as would exist if it were to be utilized by specially treating the paper. Therefore, this also enables increased printing speed.

An object of this invention is to provide asynchronous jet printing.

Another object of this invention is to use synchronized generation of droplets for asynchronous jet printing.

A further object of this invention is to provide a method and apparatus for producing a desired print pattern with ink jet printing without any requirement for deflection and charging of the droplets.

Still another object of this invention is to provide a method and apparatus for producing a desired print pattern on a recording medium from liquid stream without the formation of droplets therefrom.

A still further object of this invention is to provide a method and apparatus for producing a desired print pattern on a variety of recording mediums.

The foregoing and other objects, features, and advantages of the invention will be apparent from the following more particular description of the preferred embodiments of the invention as illustrated in the accompanying drawings.

Figure 1:
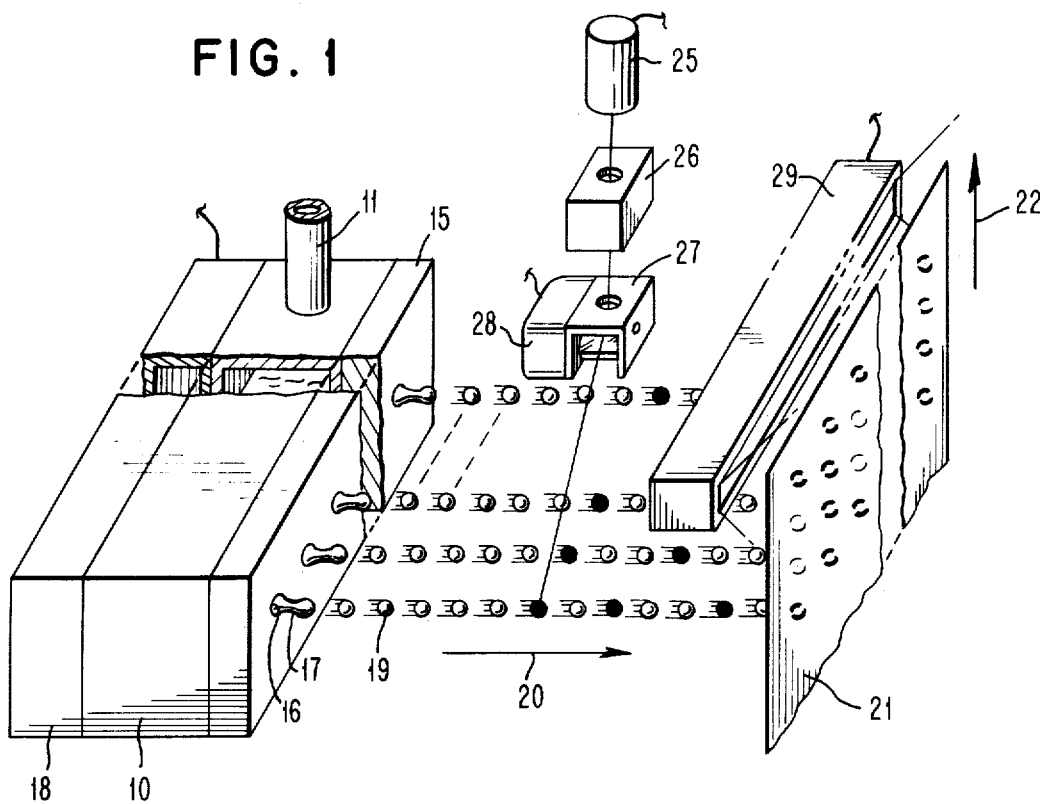
FIG. 1 is a schematic view showing one form of the information recording apparatus of the present invention.

Referring to the drawings and particularly FIG. 1, there is shown an ink reservoir or manifold 10 to which ink is supplied through a supply tube 11. In this embodiment, the ink is formed of a photosensitive material capable of changing from colorless to a color when exposed to light radiation in a selected wavelength range.

The material of the ink can be selected from any of the leuco dye classes, for example. Ultra-violet light initiates a free radical reaction followed by a chemical reaction resulting in the formation of dye molecules.

One suitable example of the ink material is sold under the trademark "Dylux" by duPont. This material is most sensitive to light radiation having a wavelength range of 320 to 360 nanometers. When subjected to radiation in this wavelength range, the material changes from transparent to blue. It is believed that by acting on the liquids, a wider latitude of combinations of sensitizers and printout materials is possible to enhance printing speed.

The ink from the reservoir 10, which is under a selected pressure, is directed through a nozzle plate 15. The nozzle plate 15 has a plurality of nozzles 16 formed therein with each of the nozzles 16 directing a stream 17 of ink therefrom.

Each of the streams 17 can be subjected to a vibrating frequency source 18 such as a piezoelectric transducer, for example, so that each of the streams 17 breaks up into a plurality of uniformly spaced droplets 19. Each of the nozzles 16 directs the droplets 19 in the direction indicated by an arrow 20. The droplets 19 are directed toward a recording medium such as a paper 21, which is moving in the direction indicated by an arrow 22.

Between the formation of the droplets 19 from the stream 17 and the striking of the paper 21 by the droplets 19, each of the droplets 19 in each of the streams 17 can be subjected to a source of light radiation having the selected wavelength range which will cause any of the transparent droplets 19 subjected thereto to become a color. Thus, the droplets 19, which are exposed, will produce a visible spot on the paper 21 as part of the print pattern.

One suitable source of light radiation is an ultra-violet laser 25 producing light within the selected wavelength range. The light from the laser 25 is supplied through a modulator 26 to a rotating mirror assembly 27. The mirror assembly 27 is rotated by suitable control means 28 so that the light from the laser 25 is directed to a droplet 19 in each of the streams 17 of the droplets 19 separately in a selected sequence. The modulator 26 is controlled so that it regulates whether the light from the laser 25 is applied to the droplet 19 to which the rotating mirror assembly 27 is directing the light from the laser 25 at the particular time.

Thus, each of the transparent droplets 19 exposed to the laser 25 becomes a color and prints a spot on the paper 21 when the droplet 19 strikes it. Any of the droplets 19, which are not subjected to the light from the laser 25, remain transparent or colorless when it strikes the paper 21.

To prevent the transparent droplets 19, which have not been exposed to the light from the laser 25, from changing to a color if the paper 21 should be exposed to a source of light radiation having a wavelength, which will expose any of the transparent droplets 19, it is necessary to desensitize or deactivate the transparent droplets 19 which have not been subjected to the light from the laser 25. Accordingly, a desensitizer 29 is employed to deactivate the transparent or colorless droplets 19, which have not been subjected to the light from the laser 25.

The desensitizer 29 is disposed to deactivate the transparent droplets 19, which have not been subjected to light from the laser 25, before or after they strike the paper 21. The desensitizer 29 can be a light source having a wavelength in the visible range of 400 to 500 nanometers.

Accordingly, the paper 21 has the desired print pattern produced thereon through the modulator 26 controlling the application of light from the laser 25 as each of the droplets 19 of each of the streams 17 advances towards the paper 21 from the nozzles 16 in the nozzle plate 15. The desensitizer 29 deactivates any of the droplets 19 which have not been subjected to light from the laser 25 to prevent any inadvertent change of the transparent droplets 19 to color if the droplets 19 should be subjected to light radiation in the selected wavelength range.

If desired, the modulator 26 can be employed to control the quantity or intensity of light applied to each of the droplets 19. Through the modulator 26 controlling the quantity or intensity of light applied to each of the droplets 19, varying contrasts of the color of each of the droplets 19 are obtained and produced on the paper 21. The desensitizer 29 insures that the droplets 19 which have been subjected to less than the full quantity or intensity of the light from the laser 25 by the modulator 26 also are deactivated insofar as being capable of changing to a darker shade of the color.

Figure 2:
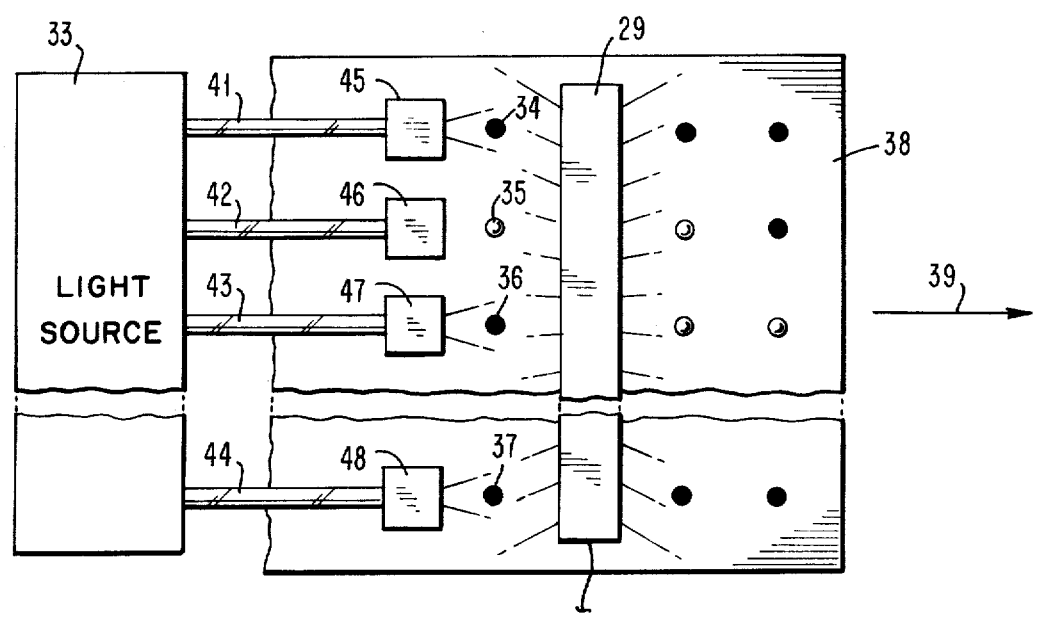
FIG. 2 is a schematic view showing another embodiment of the information recording apparatus of the present invention.

Referring to FIG. 2, there is shown a separate light source 33 producing light in the selected wave length range as the source of energy for application to separate streams 34, 35, 36, and 37, respectively, of droplets. The droplets of the streams 34–37 are preferably produced in the same manner as described with respect to FIG. 1 with the droplets of the streams 34–37 moving towards the recording medium such as a paper 38 (This is into the drawing in FIG. 2). The paper 38 is moved in the direction indicated by an arrow 39.

One suitable example of the light source 33 is an ultra-violet light. Thus, the light from the single light source 33 can be employed to cause each of the transparent droplets of each of the streams 34–37 to change to a color when subjected thereto.

The light source 33 is connected through light pipes 41, 42, 43, and 44 for application to each of the droplets of each of the streams 34, 35, 36, and 37, respectively. The light pipes 41, 42, 43, and 44 apply the light from the light source 33 through light modulating cells 45, 46, 47, and 48, respectively. One suitable example of the light modulating cells 45–48 is a liquid crystal. Instead of using the liquid crystal, any other light scattering or absorbing device can be employed as the light modulating cell such as a polarizer analyzer, for example.

Each of the light modulating cells 45–48 is separately controlled so as to determine whether each of the droplets of each of the streams 34–37 is subjected to the light source 33. The light modulating cells 45–48 are activated simultaneously for application of the light source 33 to one of the droplets in each of the streams 34–37 at the same time.

The remainder of the operation of FIG. 2 is the same as that described with respect to FIG. 1. Thus, the droplets of the streams 34–37 strike the paper 38, which is moving in the direction of the arrow 39, to record the desired print pattern, and then the transparent droplets are desensitized by the desensitizer 29, which is disposed closer to the paper 38 than the light modulating cells 45–48.

If desired, the light modulating cells 45–48 can be controlled to regulate the quantity or intensity of light supplied to the droplet. Thus, each of the droplets of each of the streams 34–37 can have a varying contrast.

Figure 3:
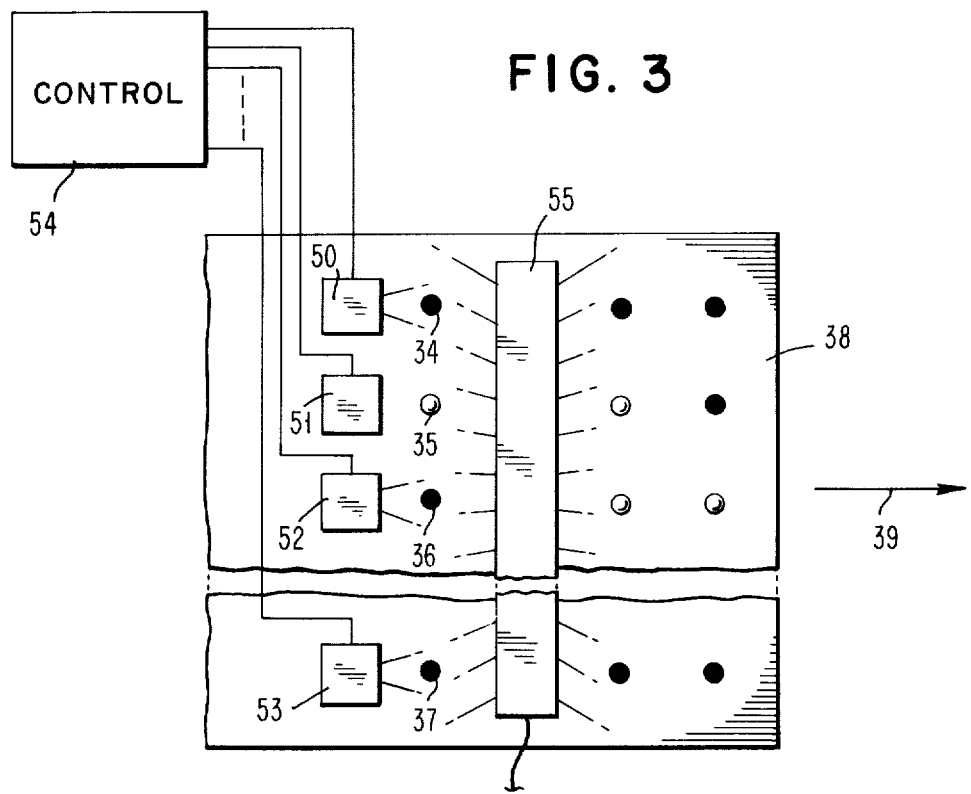
FIG. 3 is a schematic view showing a further modification of the information recording apparatus of the present invention.

Referring to FIG. 3, there are shown separate radiation sources 50, 51, 52, and 53. Each of the radiation sources 50, 51, 52, and 53 is applied to the separate streams 34, 35, 36, and 37, respectively, of droplets.

Each of the radiation sources 50–53 is separately controlled from a voltage control 54. Thus, the control 54 determines which, if any, of the radiation sources 50–53 are activated when each of the droplets of the streams 34–37, respectively, passes the radiation sources 50–53, respectively.

The radiation sources 50–53 must be capable of producing radiation in the selected wavelength range to change the transparent droplets of the streams 34–37 to a color when the radiation source is applied thereto. One suitable example of each of the radiation sources 50–53 is a laser diode.

The laser diode can produce an infrared radiation of a wavelength to act on a thermally sensitive material of which each of the streams 34–37 is formed. One example of the thermally sensitive material is a colorless diazoamino dye base. Another example of the thermally sensitive material forming the ink is a triazine type of dye base with a napthol coupling component. By including a light sensitive N-halosulfon-anilide oxidizing agent, which can be rendered inactive by exposure to an actinic radiation, the non-exposed areas of the streams can be desensitized against further action of heat.

After the selected droplets of the streams 34–37 have been subjected to the radiation sources 50–53 and before or after the droplets of the streams 34–37 have contacted the paper 38, the droplets of the streams 34–37 are subjected to a desensitizer 55. The desensitizer 55 can be the same as the desensitizer 29 and is disposed closer to the paper 38 than the radiation sources 50–53 in the same manner as the desensitizer 29 is disposed.

The desensitizer 55 deactivates any of the droplets of the streams 34–37 which have not been subjected to the radiation sources 50–53. This prevents any inadvertent changing of the transparent droplets into a color if later subjected to radiation of the selected wavelength range.

The droplets of the streams 34–37 are sensitized by the radiation sources 50–53 to produce a desired print pattern on the paper 38. The droplets of each of the streams 34–37 strike a single horizontal row of the paper 38.

The radiation sources 50–53 can be controlled by the voltage control 54 so that each of the droplets of each of the streams 34–37 can be subjected to a different quantity or intensity of radiation. Thus, each of the droplets, which is exposed to the radiation source with which it cooperates, may be a different intensity of the color to produce a varying contrast on the paper 38. The desensitizer 55 also prevents any of the droplets which have not been fully changed in color from changing to a darker shade of the color if the droplets should be exposed to a source of radiation in the selected wavelength range.

Instead of the radiation sources 50–53 producing an infrared radiation, it should be understood that they could produce light radiation within a selected wavelength range. Thus, the radiation sources 50–53 could be laser diodes having an appropriate wavelength for the chemical properties of the ink to cause it to change from transparent to a color when subjected to the radiation. Thus, the structure of FIG. 3 can be utilized to apply either light or heat as the radiation source.

Figure 4:
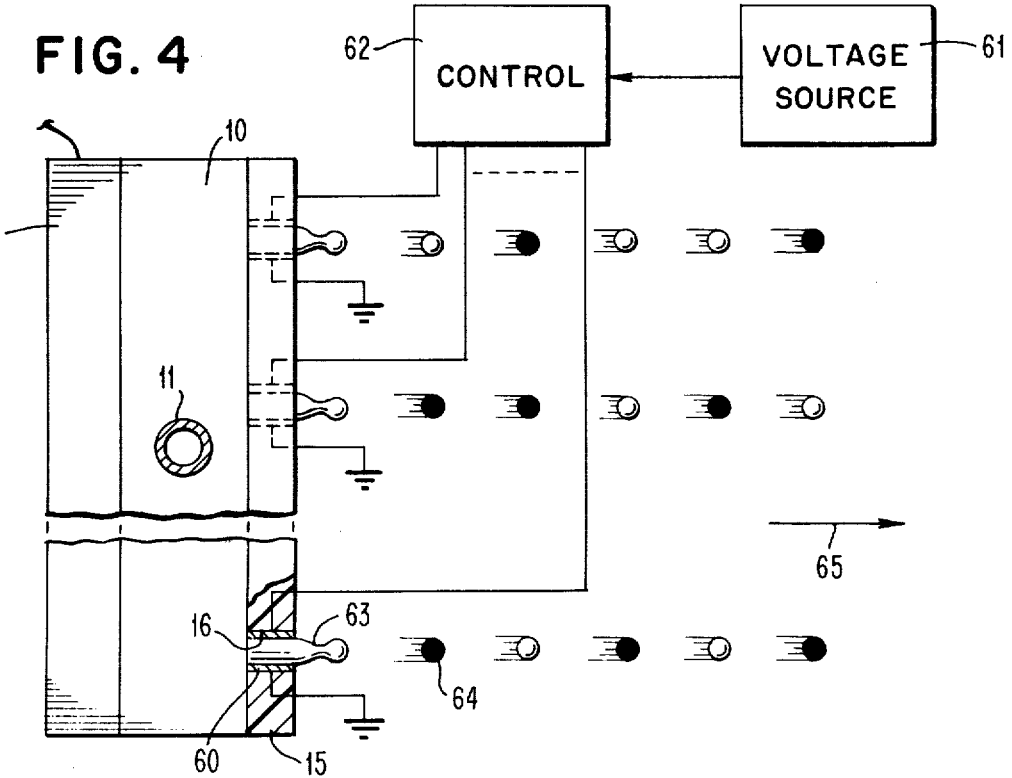
FIG. 4 is a schematic view showing still another form of the information recording apparatus of the present invention.

Referring to FIG. 4, there are shown the nozzles 16 of the nozzle plate 15 of FIG. 1. An electrode 60 is disposed within each of the nozzles 16 and connected to a source 61 of voltage by a control 62. It should be understood that each of the nozzles 16 has one of the electrodes 60 with all of the electrodes 60 being controlled by the control 62.

In this arrangement, the ink is formed of a suitable electrochromic material which will change from transparent to a color when subjected to an electric field. Suitable examples of the electrochromic materials are tungstates and molybdates.

As a stream 63 passes through the nozzle 16, the application of the electric field thereto by the control 62 allowing the voltage from the source 61 to be applied to the electrode 60 causes the portion of the stream 63 to which the electric field is applied to change from transparent to a color. This occurs through the stream 63 being in contact with the electrode 60.

The stream 63 breaks up into droplets 64 after leaving the nozzle 16 in the same manner as in FIG. 1, and the droplets 64 move in the direction of an arrow 65. Thus, the timing of the application of the electric field to the stream 63 must be coordinated with the production of the droplets therefrom.

It should be understood that the ink can be formed of material having electrochromic, photochromic, and thermal sensitive properties at the same time. The selection of one of the properties or a combination thereof would depend on how the energy source is to be applied.

While the liquid streams have been shown as being formed into droplets, it should be understood that such is not a requisite for satisfactory operation. Thus, a continuous liquid stream could be supplied, for example, and the selected energy source applied to selected portions thereof with each of the selected portions containing substantially the same quantity of the stream as the droplet. Only the selected portions of the stream subjected to the selected energy source would print on the paper.

An advantage of this invention is that it eliminates the need for charging and deflection of any ink droplets used in ink jet printing. Another advantage of this invention is that no critical synchronization of the break off point of the droplets from the stream is required. A further advantage of this invention is that it enables the recording medium to be disposed closer to the nozzles since deflection and charging means are not required whereby the nozzle tolerances need not be as stringent. Still another advantage of this invention is that the substantially uniform spacing between the droplets is maintained until the droplets strike the recording medium since there is no deflection whereby some of the aerodynamic problems are significantly reduced. A still further advantage of this invention is that there is no requirement for any specially treated paper to function as the recording medium so that recording can be accomplished on any of a variety of substrates.

While the invention has been particulary shown and described with reference to preferred embodiments thereof, it will be understood by those skilled in the art that various changes in form and details may be made therein without departing from the spirit and scope of the invention.

What is claimed is:

1. An apparatus for recording information on a recording medium including:
   means to produce a liquid stream formed of a material sensitive to a selected source of energy so as to change from transparent to a color when subjected thereto;
   and selector means to selectively subject various portions of the stream to the selected source of energy in accordance with a desired print pattern to be recorded on the recording medium to cause each of the selectively subjected portions to print on the recording medium.

2. The apparatus according to claim 1 in which said selector means applies the selected source of energy to the selected portions of the stream before the selected portions of the stream strike the recording medium.

3. The apparatus according to claim 2 including means to prevent any portion of the stream not subjected to the selected source of energy from being responsive to any source of energy capable of changing the stream from transparent to a color when subjected thereto after said selector means has applied the selected source of energy to the selected portions of the stream.

4. The apparatus according to claim 3 in which said selector means includes:
   means to produce the selected source of energy;
   and means to control the application of the selected source of energy from said producing means in accordance with the desired print pattern.

5. The apparatus according to claim 4 in which said preventing means comprises means to desensitize any portion of the stream not subjected to the selected source of energy after the stream has engaged the recording medium.

6. The apparatus according to claim 4 in which said control means includes means to control the quantity of the selected source of energy to enable the print pattern to have a varying contrast.

7. The apparatus according to claim 3 in which:
   said stream producing means includes means to produce a liquid stream of droplets;
   and said selector means selectively subjects various droplets of the stream to the selected source of energy to cause each of the selectively subjected droplets to print on the recording medium.

8. The apparatus according to claim 1 in which:
   said stream producing means includes means to produce a liquid stream of droplets;
   and said selector means selectively subjects various droplets of the stream to the selected source of energy to cause each of the selectively subjected droplets to print on the recording medium.

9. The apparatus according to claim 8 in which said selector means includes:
   means to produce the selected source of energy;
   and means to control the application of the selected source of energy from said producing means in accordance with the desired print pattern.

10. The apparatus according to claim 9 in which:
    said producing means of said selector means comprises:
    a source of radiation of a selected wavelength range as the selected source of energy;
    and means to apply said source of radiation to the stream;
    and said control means includes means to control application of the source of radiation to the droplets of the stream in accordance with the desired print pattern.

11. The apparatus according to claim 9 in which said control means includes means to control the quantity of the selected source of energy to enable the print pattern to have a varying contrast.

12. The apparatus according to claim 1 including means to prevent any portion of the stream not subjected to the selected source of energy from being responsive to any source of energy capable of changing the stream from transparent to a color when subjected thereto after said selector means has applied the selected source of energy to the selected portions of the stream.

13. The apparatus according to claim 1 in which:
    said producing means includes means to produce a plurality of substantially parallel liquid streams, each of the streams being formed of a material sensitive to a selected source of energy so as to change from transparent to a color when subjected thereto;

and said selector means selectively subjects various portions of each of the streams to the selected source of energy to cause each of the selectively subjected portions to print on the recording medium.

14. The apparatus according to claim 13 in which said selector means applies the selected source of energy to the selected portions of the streams before the selected portions of the streams strike the recording medium.

15. The apparatus according to claim 14 including means to prevent any portion of the streams not subjected to the selected source of energy from being responsive to any source of energy capable of changing the streams from transparent to a color when subjected thereto after said selector means has applied the selected source of energy to the selected portions of each of the streams.

16. The apparatus according to claim 15 in which said selector means includes:

means to produce the selected source of energy;

and means to control the application of the selected source of energy from said producing means in accordance with the desired print pattern.

17. The apparatus according to claim 16 in which said control means includes means to control the quantity of the selected source of energy to enable the print pattern to have a varying contrast.

18. The apparatus according to claim 13 in which:

said stream producing means includes means to produce a plurality of liquid streams of droplets;

and said selector means selectively subjects various droplets of each of the streams to the selected source of energy to cause each of the selectively subjected droplets to print on the recording medium.

19. The apparatus according to claim 18 in which said selector means includes:

means to produce the selected source of energy;

and means to control the application of the selected source of energy from said producing means in accordance with the desired print pattern.

20. The apparatus according to claim 19 in which:

said producing means of said selector means comprises:

a single source of light radiation of a selected wavelength range as the selected source of energy;

and means to apply said single source of light radiation to each of the streams;

and said control means includes means to control application of the single source of light radiation to each stream in accordance with the desired print pattern.

21. The apparatus according to claim 20 in which said applying means includes means to apply the single source of light radiation to each of the streams separately.

22. The apparatus according to claim 20 in which said applying means includes means to apply the single source of light radiation to each of the streams separately and simultaneously.

23. The apparatus according to claim 20 in which said control means includes separate control means for each of the streams.

24. The apparatus according to claim 19 in which:

said producing means of said selector means includes means to produce a separate source of energy as the selected source of energy for each of the streams, each of said separate producing means being capable of application separately to each droplet of the stream;

and said control means includes means to control each of said separate producing means to control when said producing means applies the source of energy to a droplet of the stream.

25. The apparatus according to claim 24 in which each of the separate sources of energy is a separate radiation of a selected wavelength.

26. The apparatus according to claim 19 in which:

said producing means of said selector means includes means to produce a separate electric field as the selected source of energy for each of the streams, each of said separate electric fields being applied separately to each droplet of the stream;

and said control means includes means to control each of said separate producing means to control when said producing means applies the electric field to a droplet of the stream.

27. A method for recording information on a recording medium including:

producing a liquid stream formed of a material sensitive to a selected source of energy so as to change from transparent to a color when subjected thereto;

and selectively subjecting various portions of the stream to the selected source of energy in accordance with a desired print pattern to be recorded on the recording medium to cause each of the selectively subjected portions to print on the recording medium.

28. The method according to claim 27 including applying the selected source of energy to the selected portions of the streams before the selected portions of the stream strike the recording medium.

29. The method according to claim 28 including preventing any portion of the stream not subjected to the selected source of energy from being responsive to any source of energy capable of changing the stream from transparent to a color when subjected thereto after the selected source of energy has been applied to the selected portions of the stream.

30. The method according to claim 29 including:

producing the selected source of energy;

and controlling the application of the selected source of energy in accordance with the desired print pattern.

31. The method according to claim 30 including desensitizing any portion of the stream not subjected to the selected source of energy after the stream has engaged the recording medium.

32. The method according to claim 30 including controlling the quantity of the selected source of energy during its application to enable the print pattern to have a varying contrast.

33. The method according to claim 29 including:

producing a liquid stream of droplets;

and selectively subjecting various droplets of the stream to the selected source of energy to cause each of the selectively subjected droplets to print on the recording medium.

34. The method according to claim 27 including:

producing a liquid stream of droplets;

and selectively subjecting various droplets of the stream to the selected source of energy to cause each of the selectively subjected droplets to print on the recording medium.

35. The method according to claim 34 including:
producing the selected source of energy;
and controlling the application of the selected source of energy in accordance with the desired print pattern.

36. The method according to claim 35 including:
producing a source of radiation of the selected wavelength range as the selected source of energy;
applying the source of radiation to each of the selected droplets of the stream;
and controlling the application of the source of radiation to each droplet of the stream in accordance with the desired print pattern.

37. The method according to claim 35 including controlling the quantity of the selected source of energy during its application to enable the print pattern to have a varying contrast.

38. The method according to claim 27 including preventing any portion of the stream not subjected to the selected source of energy from being responsive to any source of energy capable of changing the stream from transparent to a color when subjected thereto after the selected source of energy has been applied to the selected portions of the stream.

39. The method according to claim 27 including:
producing a plurality of substantially parallel liquid streams with each of the streams formed of a material sensitive to the selected source of energy so as to change from transparent to a color when subjected thereto;
and selectively subjecting various portions of each of the streams to the selected source of energy to cause each of the selectively subjected portions to print on the recording medium.

40. The method according to claim 39 including applying the selected source of energy to the selected portions of the streams before the selected portions of the streams strike the recording medium.

41. The method according to claim 40 including preventing any of the stream portions not subjected to the selected source of energy from being responsive to any source of energy capable of changing the stream from transparent to a color when subjected thereto after the selected source of energy has been applied to the selected portions of each of the streams.

42. The method according to claim 41 including:
producing the selected source of energy;
and controlling the application of the selected source of energy in accordance with the desired print pattern.

43. The method according to claim 42 including controlling the quantity of the selected source of energy during its application to enable the print pattern to have a varying contrast.

44. The method according to claim 39 including:
producing a plurality of liquid streams of droplets;
and selectively subjecting various droplets of each of the streams to the selected source of energy to cause each of the selectively subjected droplets to print on the recording medium.

45. The method according to claim 44 including:
producing the selected source of energy;
and controlling the application of the selected source of energy in accordance with the desired print pattern.

46. The method according to claim 45 including:
producing a single source of light radiation of a selected wavelength range as the selected source of energy;
applying the single source of light radiation to each of the selected droplets of each of the streams;
and controlling the application of the single source of light radiation to each droplet of each of the streams in accordance with the desired print pattern.

47. The method according to claim 46 including applying the single source of light radiation to each of the streams separately.

48. The method according to claim 46 including applying the single source of light radiation to each of the streams separately and simultaneously.

49. The method according to claim 46 including separately controlling the application of the single source of light radiation to each of the streams.

50. The method according to claim 45 including:
producing a separate source of energy as the selected source of energy for each of the streams;
and controlling the application of the separate source of energy for the specific stream to determine to which droplets of the stream that the source of energy is applied.

51. The method according to claim 50 in which each of the separate sources of energy is a separate radiation of a selected wavelength.

52. The method according to claim 45 including:
producing a separate electric field as the selected source of energy for each of the streams;
and controlling the application of the separate electric field for the specific stream to determine to which droplets of the stream that the electric field is applied.

* * * * *